J. V. WOODWORTH.
PRESSED METAL WHEEL.
APPLICATION FILED AUG. 3, 1912.
1,129,617.
Patented Feb. 23, 1915.
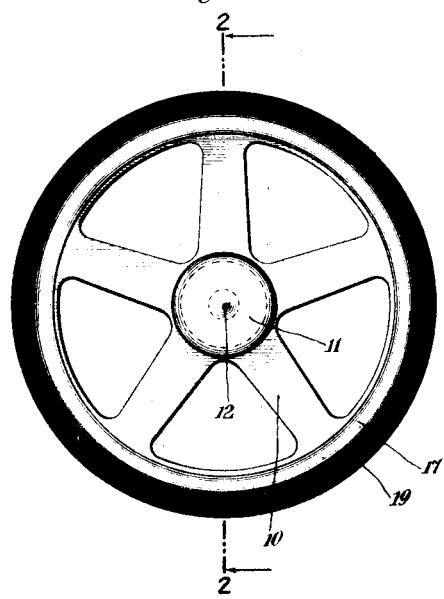
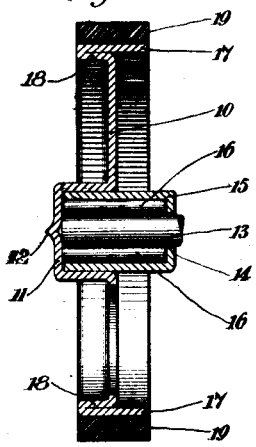
Witnesses:
John E. Rager
A. Worden Gibbs
Inventor
Joseph V. Woodworth
By his Attorney

UNITED STATES PATENT OFFICE.

JOSEPH V. WOODWORTH, OF BROOKLYN, NEW YORK, ASSIGNOR TO BOSTON PRESSED METAL COMPANY, OF WORCESTER, MASSACHUSETTS, A CORPORATION OF MAINE.

PRESSED METAL WHEEL.

1,129,617.  Specification of Letters Patent.  Patented Feb. 23, 1915.

Application filed August 3, 1912. Serial No. 713,055.

*To all whom it may concern:*

Be it known that I, JOSEPH V. WOODWORTH, a citizen of the United States, and a resident of Brooklyn, in the county of Kings and State of New York, have invented certain new and useful Improvements in Pressed Metal Wheels, of which the following is a specification.

The invention relates to pressed metal work, and more particularly to a wheel constructed of sheet metal and designed more especially for use at the end of a shaft or axle.

It has for its object to form a wheel of such material and of but two parts, both of which may be readily struck up from suitable blanks; and, moreover, to provide a balanced wheel and one which will admit of retaining a shaft and a suitable bearing therefor.

The nature of the invention will best be understood when described in connection with the accompanying drawings, in which—

Figure 1 is a front elevation of the wheel. Fig. 2 is a transverse section taken on the line 2—2, Fig. 1.

Similar characters of reference designate corresponding parts throughout the several views.

Referring to the drawings, 10 designates a blank, circular in shape, and providing the web of the wheel; and in the center of which a locating seat 11 has been drawn. The outer face of the bottom of said seat may be provided with a projection 12 to receive a flat spring or the like (not shown) to hold the wheel to the end of a shaft or axle, as the shaft 13. This shaft extends through an opening 14 in a retaining cap 15, which may be struck from a suitable blank, said cap being forced into the locating seat 11, and the said seat and cap thus form the hub of the wheel. The end of shaft 13 abuts the bottom of the seat 11, and is preferably surrounded by suitable bearings, as the roller bearings 16 retained within and by the cap 15.

The rim 17 of the wheel is pressed from the blank 10 by turning a part of the cupped portion back over a portion 18 thereof and pressing the same together. The said rim extends equally on both sides of the web; and, if it be desired to further reinforce said rim, the portion 17 may be turned back and under, sufficient material, of course, being provided therefor from the blank. The edges of the rim are designed to lie between the planes of the outer surfaces of the seat 11 and cap 15, and which latter is so adjusted as to perfectly balance the wheel causing it to run true on the shaft 13. A rubber tire 19 or the like may be placed over the rim 17 if desired.

I claim:—

A pressed metal wheel, comprising a circular disk of metal with the central portion thereof cupped to provide an integral and cylindrical locating seat forming one portion of a balancing hub of said wheel, a retaining cap fitting said locating seat, frictionally held therein and providing the other portion of said hub, said cap retaining suitable roller bearings and having an opening at its outer end to receive an axle adapted to abut the bottom of said locating seat.

Signed at New York in the county of New York and State of New York this 2nd day of August A. D. 1912.

JOSEPH V. WOODWORTH.

Witnesses:
LAURA E. SMITH,
FREDK. F. SCHUETZ.